G. D. COOPER.
TRUSS.
APPLICATION FILED APR. 15, 1916. RENEWED FEB. 23, 1917.
1,237,480.　　　　　　　　　　　　Patented Aug. 21, 1917.
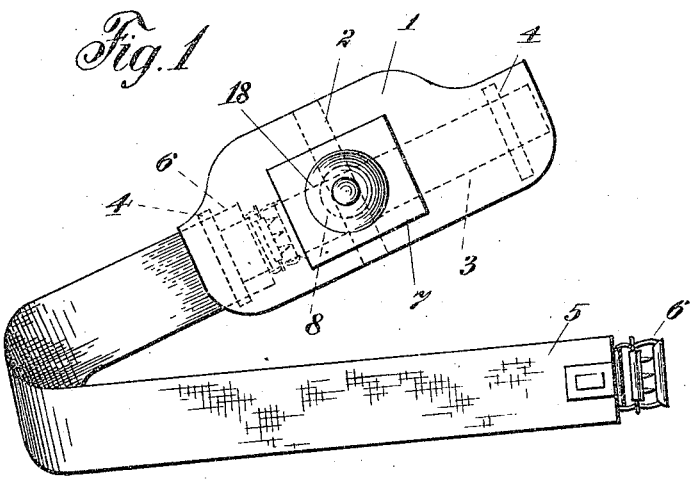
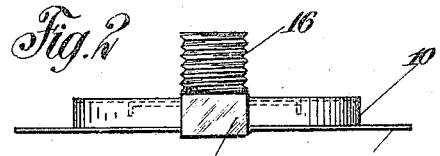
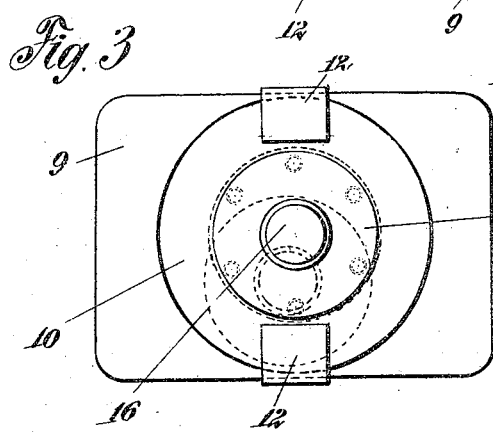
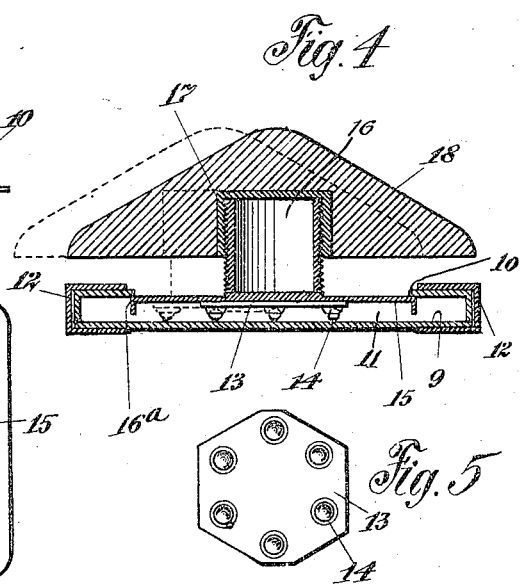
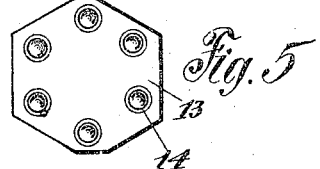
Inventor
George D. Cooper
Witness
Karl H. Butler
Charles Belg
By
Attorney

UNITED STATES PATENT OFFICE.

GEORGE D. COOPER, OF FLINT, MICHIGAN.

TRUSS.

1,237,480.

Specification of Letters Patent.  Patented Aug. 21, 1917.

Application filed April 15, 1916, Serial No. 91,290. Renewed February 23, 1917. Serial No. 150,617.

*To all whom it may concern:*

Be it known that I, GEORGE D. COOPER, a citizen of the United States of America, residing at Flint, in the county of Genesee and State of Michigan, have invented certain new and useful Improvements in Trusses, of which the following is a specification, reference being had therein to the accompanying drawings.

This invention relates to rupture pads and the primary object of my invention is to furnish a belt or body harness with shiftable pad which may remain in a prescribed position relative to the body while the belt or harness moves relative to the pad or vice versa, thereby preventing accidental displacement of the rupture pad due to body movements or shifting of its holding means.

Another object of my invention is to provide rupture pads which may be advantageously used in connection with umbilical ruptures or impaired abdominal regions where considerable difficulty is encountered in maintaining a pad or pressure member in proper relation to the affected body parts on account of body movement.

A further object of my invention is to furnish a belt or body harness with a self-adjusting pressure pad consisting of comparatively few parts that are inexpensive to manufacture, easy to assemble and highly efficient for the purposes for which they are intended.

The above and other objects are attained by a mechanical construction that will be hereinafter specifically described and then claimed, and reference will now be had to the drawings, wherein—

Figure 1 is a perspective view of a belt provided with a rupture pad in accordance with my invention;

Fig. 2 is a side elevation of the detached pad bearing;

Fig. 3 is a plan of the same;

Fig. 4 is a cross sectional view of the pad and its bearing, and

Fig. 5 is a plan of a detached ball cage.

In the drawing, 1 denotes a belt pad and connected to the outer side thereof by a strap 2 is a take up member or tab 3. The ends of the pad 1 have straps 4 and adapted to extend through said straps are the ends of a pliable or flexible belt 5 provided with buckles 6 whereby it may be connected to the take-up member or tabs 3 to hold the pad 1 at or against a portion of a body.

The pad 1 and the belt 5 are of a conventional form common to a great many rupture appliances and has been illustrated merely as an example of a body harness for holding a pressure pad in accordance with my invention.

Secured to the inner side of the pad 1 by stitches or other fastening means is a case 7 having a central opening 8 and mounted in said case is a fixed socket member, comprising a plate 9 on which there is clamped or otherwise mounted a ring 10 coöperating with said plate in forming an annular housing 11. The ring 10 is angular in cross section and may be retained upon the plate 9 by channel clamping members or clips 12 slipped over the edges of the plate 9 and the ring 10.

In the housing 11 is a ball cage 13 containing anti-frictional balls 14. The ball cage 13 is preferably in the form of a metallic plate stamped out to provide a plurality of sockets for the balls 14 which are adapted to ride upon the plate 9. On the ball cage 13 is a flat stud member 15 having a depending flange 16$^a$ which confines movement of the ball cage beneath the stud member, and said stud member is of greater area than the opening of the housing 11 whereby it cannot become accidentally displaced through the opening, but may shift within the housing. The stud member 15 has a central stud 16 which is exteriorly screwthreaded and adapted to receive the socket 17 of a pressure pad 18. It is through the medium of the stud 16 and the socket 17 that the pad 18 may be adjusted relative to the socket member or may be removed and another style of pad substituted therefor. As shown, the pad 18 is conical in elevation and is, otherwise than herein stated, similar to rupture pads.

The adjustability of the pad relative to the pad 5 allows the pressure pad 18 to remain in engagement with the abdominal region, as in the case of umbilical hernia, while the belt 5 and the pad 1 moves with the body, consequently the pressure pad 18 cannot become accidentally displaced. The anti-frictional ball bearings used in the housing 11 allows the stud member and its pad to freely shift relative to the socket member, yet maintaining that degree of pressure against the body essential for relief in cases of rupture.

The device herein described is not limited to any specific use, and while in the drawing there is illustrated a preferred embodiment of my invention, it is to be understood that the structural elements are susceptible to such changes in size, shape and manner of assemblage as fall within the scope of the appended claims.

What I claim is:—

1. A device of the type described comprising a fixed pad, a case carried thereby, a socket member in said case, a self adjusting stud member in said socket member and protruding from said case, and an adjustable pressure pad carried by said stud member.

2. A support for a rupture pad comprising a housing having an opening, a stud member in said housing of larger area than the opening of said housing, an anti-frictional bearing between said stud member and a wall of said housing, and a pressure pad carried by said stud member outside of said housing.

3. A support for a rupture pad comprising a housing having an opening, a self adjusting stud member in said housing and of larger area than the opening of said housing and normally closing the greater part of the housing opening, and an adjustable pressure pad carried by said stud member outside of said housing.

In testimony whereof I affix my signature in presence of two witnesses.

GEORGE D. COOPER.

Witnesses:
JARED VAN VLEET,
FRANK GOULD.

Copies of this patent may be obtained for five cents each, by addressing the "Commissioner of Patents, Washington, D. C."